US010967467B2

(12) United States Patent
Brannon

(10) Patent No.: US 10,967,467 B2
(45) Date of Patent: Apr. 6, 2021

(54) WIRE TWISTING SYSTEM AND METHOD

(71) Applicant: R & D Tool LLC, Bowling Green, KY (US)

(72) Inventor: Rick Brannon, Bowling Green, KY (US)

(*) Notice: Subject to any disclaimer, the term of this patent is extended or adjusted under 35 U.S.C. 154(b) by 71 days.

(21) Appl. No.: 16/373,957

(22) Filed: Apr. 3, 2019

(65) Prior Publication Data

US 2019/0308287 A1 Oct. 10, 2019

Related U.S. Application Data

(60) Provisional application No. 62/654,393, filed on Apr. 7, 2018.

(51) Int. Cl.
*B23P 19/04* (2006.01)
*F16B 21/02* (2006.01)
*F16D 43/21* (2006.01)
*F16D 7/02* (2006.01)

(52) U.S. Cl.
CPC ........... *B23P 19/04* (2013.01); *F16B 21/02* (2013.01); *F16D 7/025* (2013.01); *F16D 43/215* (2013.01)

(58) Field of Classification Search
CPC ........ B23P 19/04; F16B 21/02; F16B 39/101; F16B 39/20; F16B 21/06; F16B 21/08; F16B 39/10; F16D 43/215; F16D 7/025; F16D 43/20; F16D 7/00; F16D 3/14; B21F 15/04; B25B 23/0092
See application file for complete search history.

(56) References Cited

U.S. PATENT DOCUMENTS

| | | | | |
|---|---|---|---|---|
| 2,416,002 A | * | 2/1947 | Greer | B21F 15/04 140/121 |
| 3,420,280 A | * | 1/1969 | Allyn | B65B 13/285 140/149 |
| 5,560,402 A | * | 10/1996 | Bates | B21F 15/04 140/118 |
| 2014/0165793 A1 | * | 6/2014 | Legg | B21F 15/04 81/319 |

* cited by examiner

*Primary Examiner* — Lawrence Averick
(74) *Attorney, Agent, or Firm* — Chris Tanner; FYPA PLLC

(57) ABSTRACT

A novel head device generally consisting of at least one aperture that is capable of excepting different sizes of safety wire, at least one cam-locking lever, which may incorporate a spring return mechanism, is disclosed. The body may be rotated by a mechanical means which twists the safety wire. In preferred embodiment, the various elements of the safety wire twister device are each configured with means of limiting torque or twists of safety wire to eliminate possibility of over torqueing or twisting of safety wire.

20 Claims, 11 Drawing Sheets

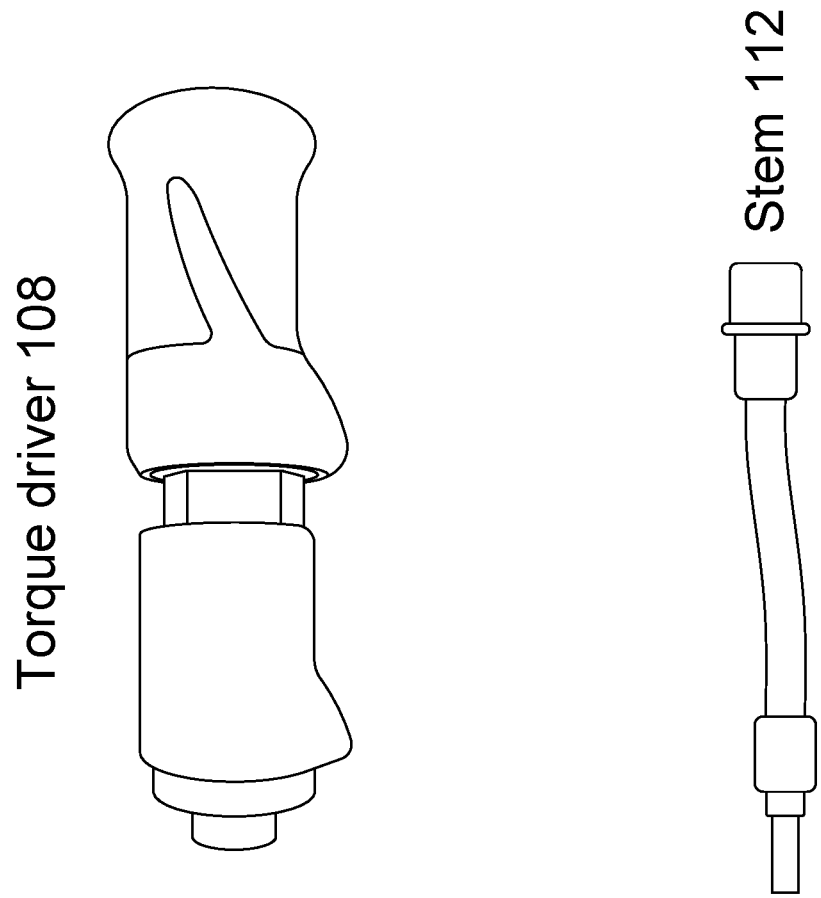
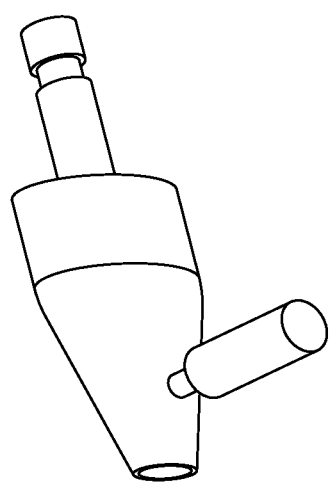
FIG. 1

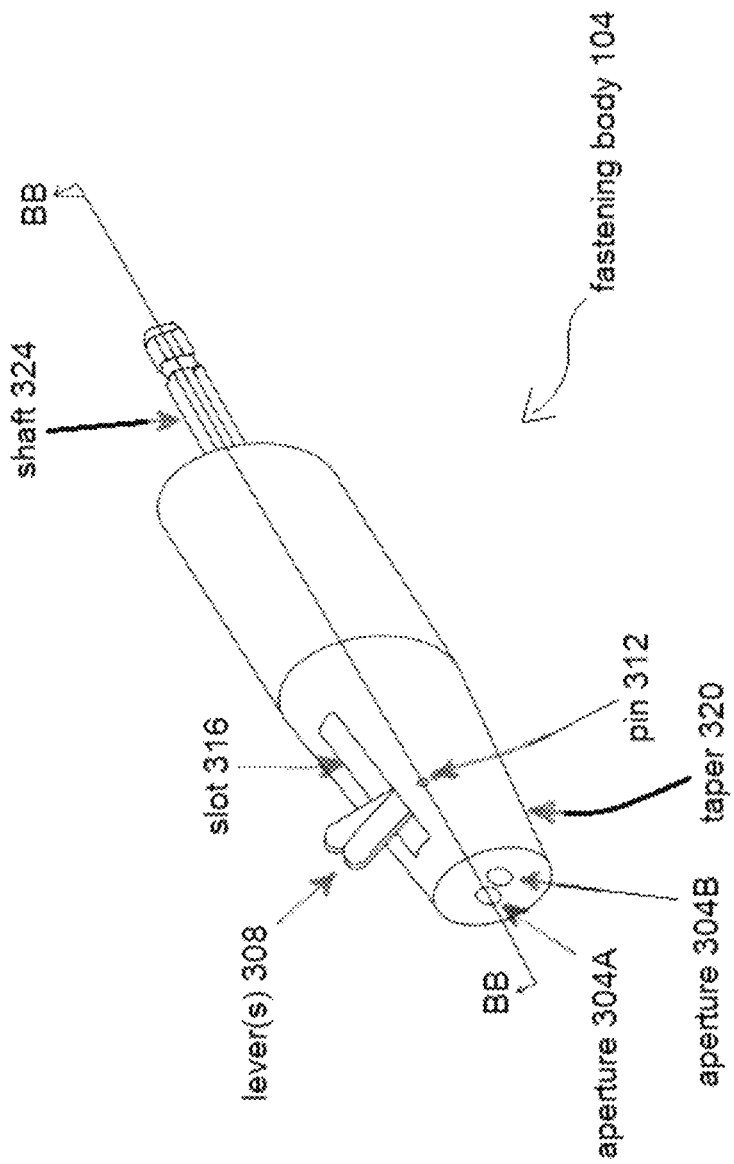

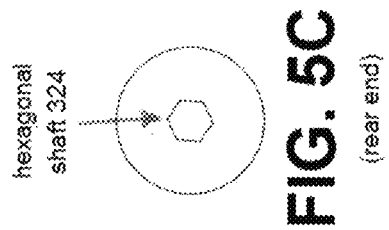
FIG. 5C (rear end)
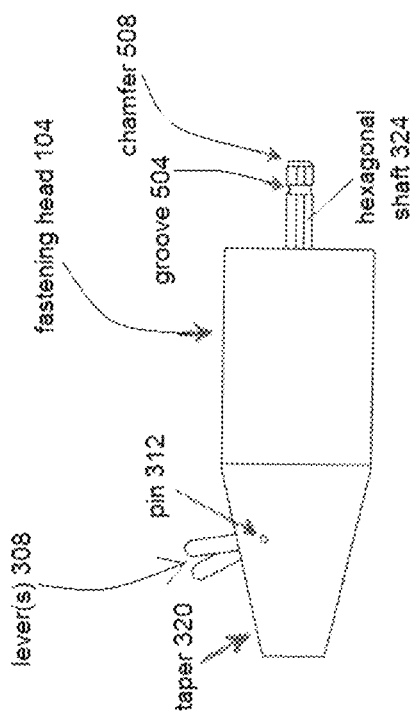
FIG. 5B
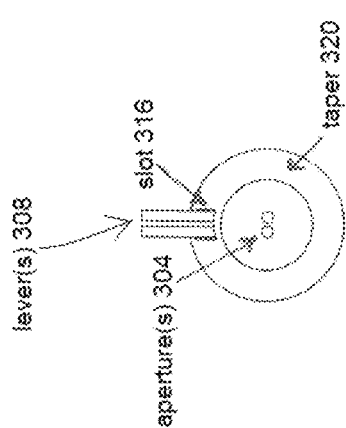
FIG. 5A

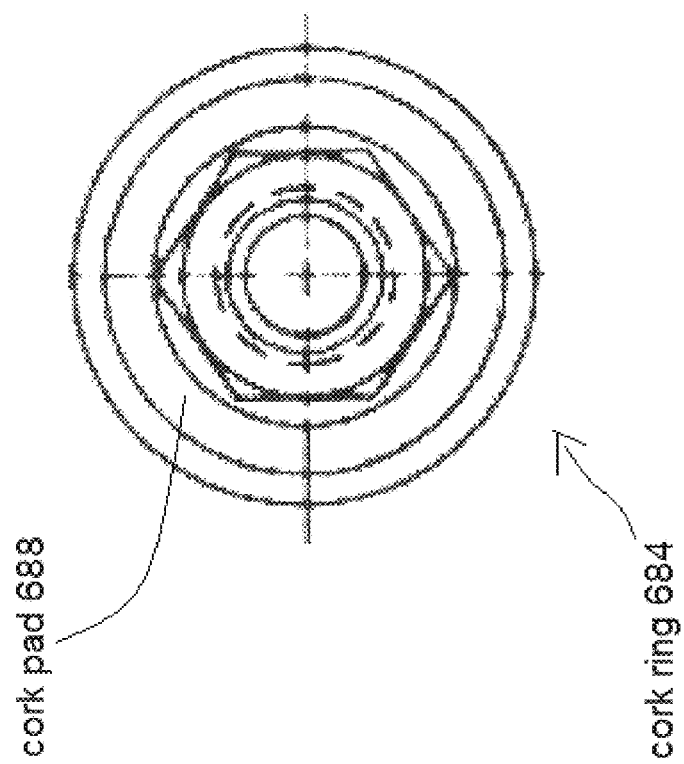

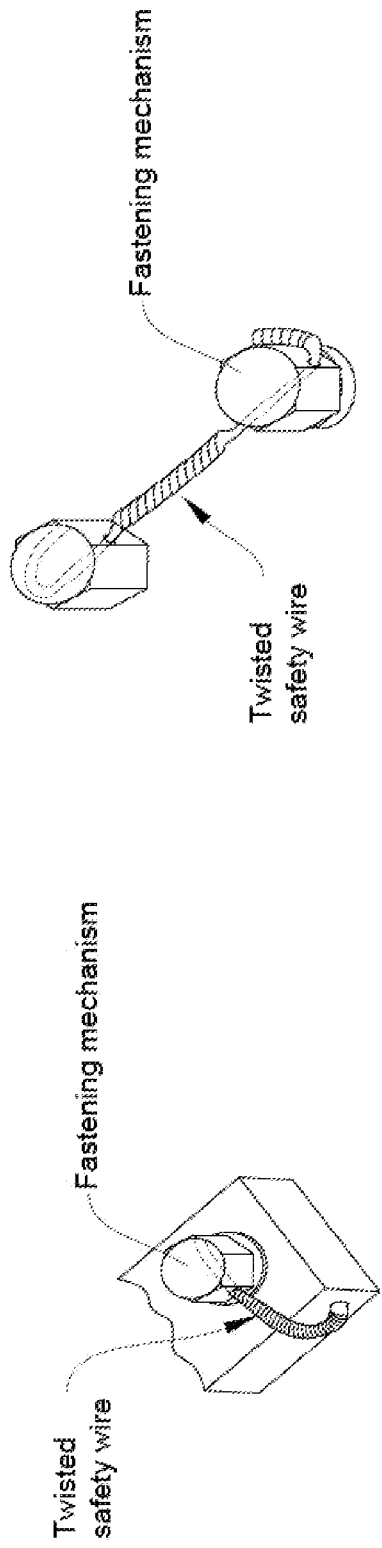
FIG. 7A (Prior Art)
FIG. 7B (Prior Art)
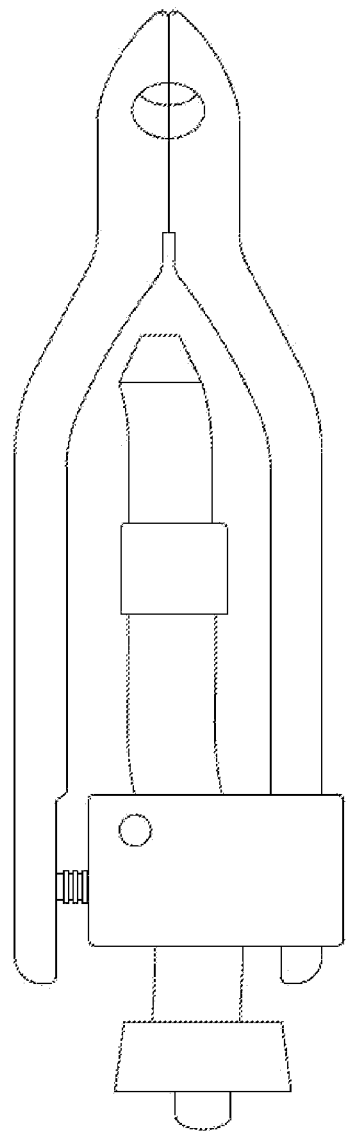
FIG. 7C (Prior Art)

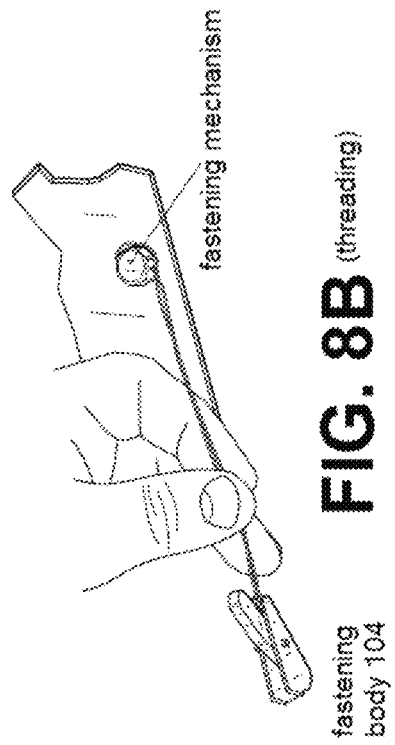
FIG. 8B (threading)
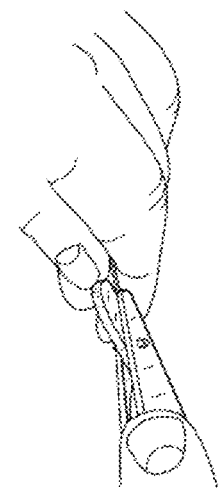
FIG. 8D (move to locking)
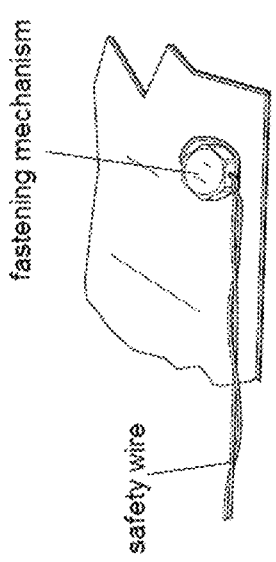
FIG. 8A (untwisted)
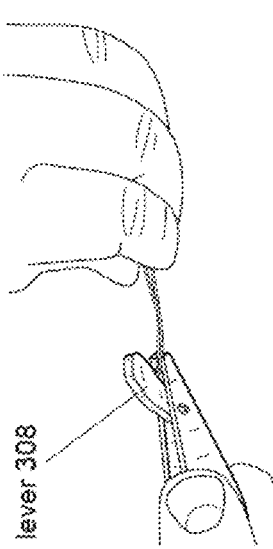
FIG. 8C (forcing)

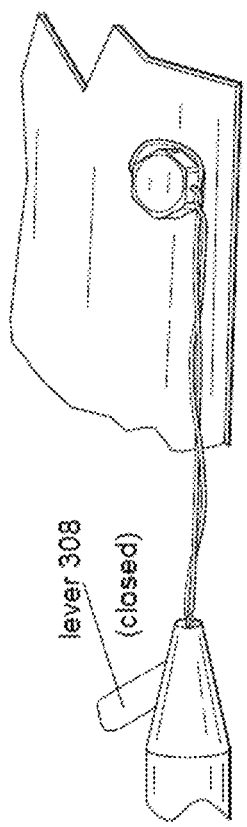
FIG. 8E (prior to activation of torque provider 108)
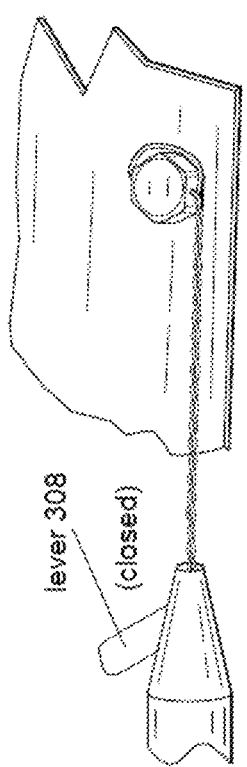
FIG. 8F (during activation of torque provider 108)
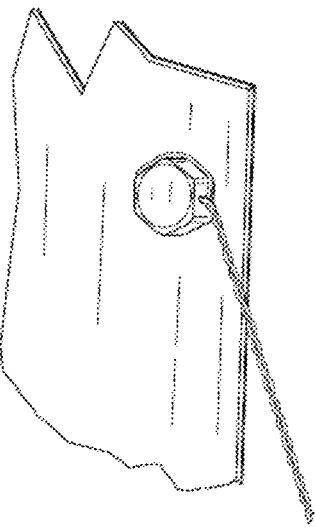
FIG. 8G (twisting completed)

WIRE TWISTING SYSTEM AND METHOD

FIELD OF THE INVENTION

The embodiments herein relate to the application of safety wire onto bolts, screws, cap screws, studs, nuts, turnbuckles, and screws, among other fastening mechanism. More particularly, the invention relates to the twisting of various sizes of safety wire to prevent the various fastening mechanisms from loosening due to vibration or other causes on aircraft, helicopters, ships, army tanks, race cars, race motorcycles and various other items where loosening of these fastening mechanisms could be deadly.

BACKGROUND

The aircraft industry along with many other industries are required to utilize various forms of safety measures to prevent loosening of critical components such a fastening mechanisms due to vibration or other factors. One of the safety measures employed is the use of safety wire to insure that fasteners, such as cap screws, studs, nuts, bolts, turn buckle screws etc. are safely and securely installed. Examples of such fastening mechanisms are shown in FIGS. 7A and 7B (Prior Art).

The current method of applying safety wire requires a pair of manually operated safety wire pliers, an example of which is shown in FIG. 7C. Unfortunately, this method is time consuming, requires repetitive motion and does not produce consistent results.

To address these and other problems, the embodiments herein are safer, faster, provide consistent results, save valuable time, and provides better application of safety wire, and greatly reduces repetitive-motion, repetitive-stress, and carpal-tunnel types of injuries to mechanics.

SUMMARY OF THE INVENTION

The safety wire twister embodiments described herein provides a new and improved battery powered safety wire twisting tool, which includes a means for securely holding two ends of a wire to twist the wire to a predetermined level of torque (which can be set by a user). The embodiments comprise a fastener body, typically comprised of hard tool steel or a similar type of material, which is attached to a shaft for rotating the head. The embodiments further include a slip or overload clutch, which acts as a torque limiter that automatically slips or disengages the clutch at a predetermined torque. This is useful for preventing over-twisting, ripping, or disengagement of the safety wire.

BRIEF DESCRIPTION OF THE DRAWINGS

FIG. 1 shows one example embodiment of a safety wire twisting system;

FIG. 3 illustrates an isometric view of a safety wire twisting head according to various embodiments;

FIGS. 5A, 5B, and 5C are a front, side, and rear view of various embodiments;

FIGS. 6A, 6B, and 6C shows components of a slip clutch;

FIGS. 7A and 7B show Prior Art fastening mechanisms;

FIG. 7C shows a Prior Art set of wire-twisting pliers; and

FIGS. 8A, 8B, 8C, 8D, 8E, 8F, and 8G show a visual flow of how human hands interact with the system.

DETAILED DESCRIPTION OF THE INVENTION

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and claims.

Novel and innovative safety wire twisting devices, apparatuses, and methods for positioning and twisting safety wire around fasteners, such as cap screws, studs, nuts, bolts, and turnbuckle screws are discussed herein. In the following description, for purposes of explanation, numerous specific details are set forth in order to provide a thorough understanding of the present invention. However, it will be evident to one skilled in the art that the present invention may be practiced without these specific details.

One potential user of the safety wire twister systems described herein can be the aircraft industry, although other industries such as automotive would certainly benefit as well. For example, the average automotive technician may have an extensive tool collection of significant value and a tool cabinet worth potentially even more. As such, at present, it is likely that some version of a conventional "wire-twister" mechanism (e.g. that shown in FIG. 7C) is already in most mechanics' toolboxes. This conventional mechanism may be pliers (FIG. 7C), or may be powered, or some hybrid of both.

The safety wire twister systems described herein can be used for applying safety wire to an aircraft, helicopter, army tank, vehicle, motorbike, boiler or any other item that may have bolts, screws, nuts, turnbuckles or any type of connector that needs to be secured as to not loosen from vibration or other mechanical disturbance.

FIG. 1 shows an example system 100, comprising a fastening head 104, a torque provider 108, and a stem 112 (optional). One potential torque provider 108 could be a cordless drill.

Figure 2:
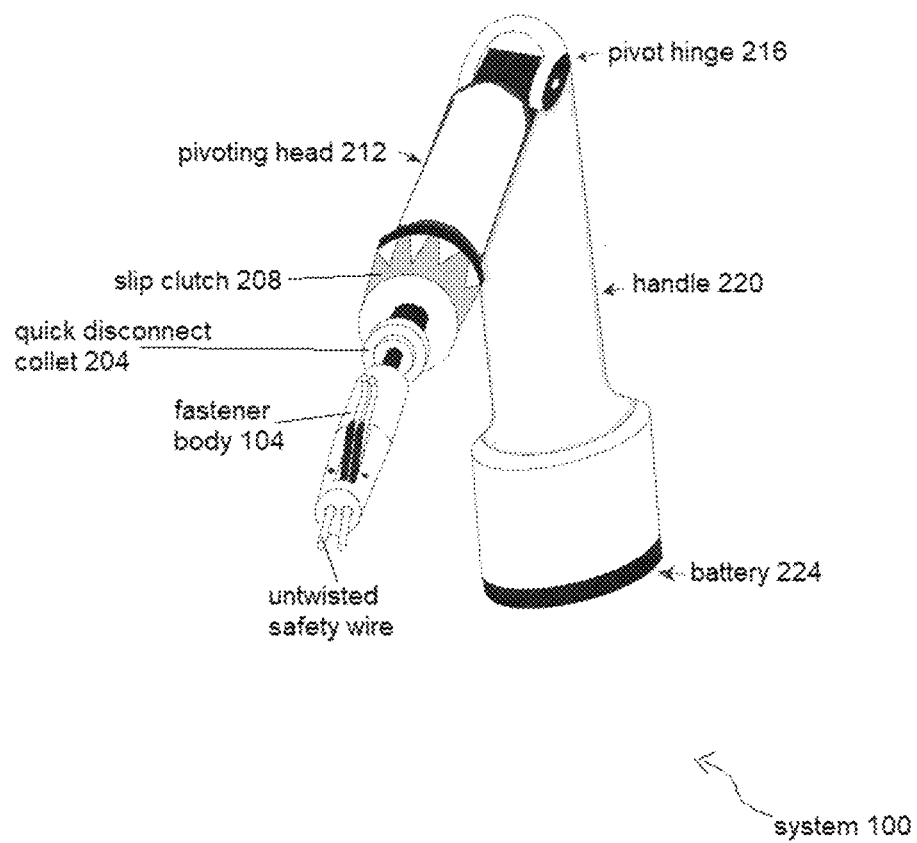
FIG. 2 shows more detail of the example safety wire twisting system of FIG. 1.

FIG. 2 show further detail of the safety wire system 100 of FIG. 1. In an embodiment, the fastener body 104 is manufactured from e.g. 4140 pre-hardened tool steel or a similar suitable material. The torque provider 108 acts as a mechanical means of rotation and may be similar to an electric screwdriver and can be but not limited to electric, battery powered, pneumatic, and even potentially a hand-ratchet. Additionally, in an embodiment, the torque provider 108 would have features such as torque feedback and stopping or slipping once a predetermined threshold of torque is reached.

One means of achieving this feature is through a slip clutch 208, as briefly shown in FIG. 2 (somewhat hidden from view) within the torque provider 108. The slip or overload clutch 208 acts as a torque limiter that automatically slips or disengages a clutch-fitting once a predetermined threshold of torque is achieved.

However, an embodiment also exists in which a slip clutch 208 is positioned not within the torque provider 108, but instead located directly within the fastening head 104. This separate slip clutch 600 is described in more detail with respect to FIG. 6. Because there are multiple implementations of this feature, the slip clutch will sometimes be referred to herein as slip clutch 208/600. The slip clutch 208/600 is configured to be user-adjustable to obtain a predetermined threshold number of twists per inch of the safety wire.

Next, the fastener body 104 is typically configured to accept and hold one or more free ends of the safety wire. The fastener body 104 may incorporate only one aperture 304, or may have more aperture(s) 304, and can be locked to accept the free (unattached) ends of safety wire.

As further shown in FIG. 2, a pivoting head 212 allows use in horizontal or pistol grip configuration. Specifically, a pivot hinge 216 allows adjustment. FIG. 2 also shows an example handle 220 and removable rechargeable battery 224.

FIG. 3 shows an isometric perspective view of various components of the fastener body 104. As stated, the fastener body 104 has either one aperture 304, two apertures 304A and 304B, or some other number, located in small diameter end of the fastener body 104. The aperture(s) 304 accept one or more free ends of the safety wire.

Figure 4B:
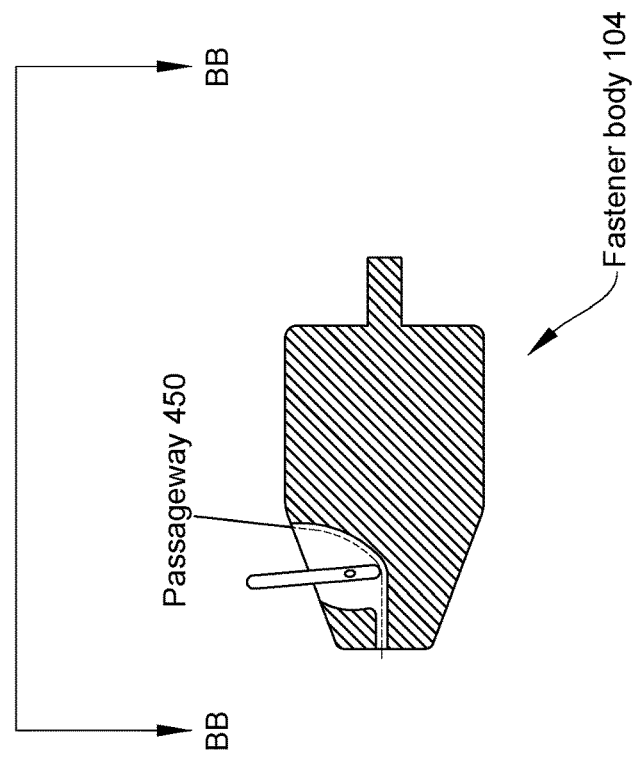
FIGS. 4A and 4B depicts a sectional view along the line BB-BB shown in FIG. 3 according to various embodiments.
Figure 4A:
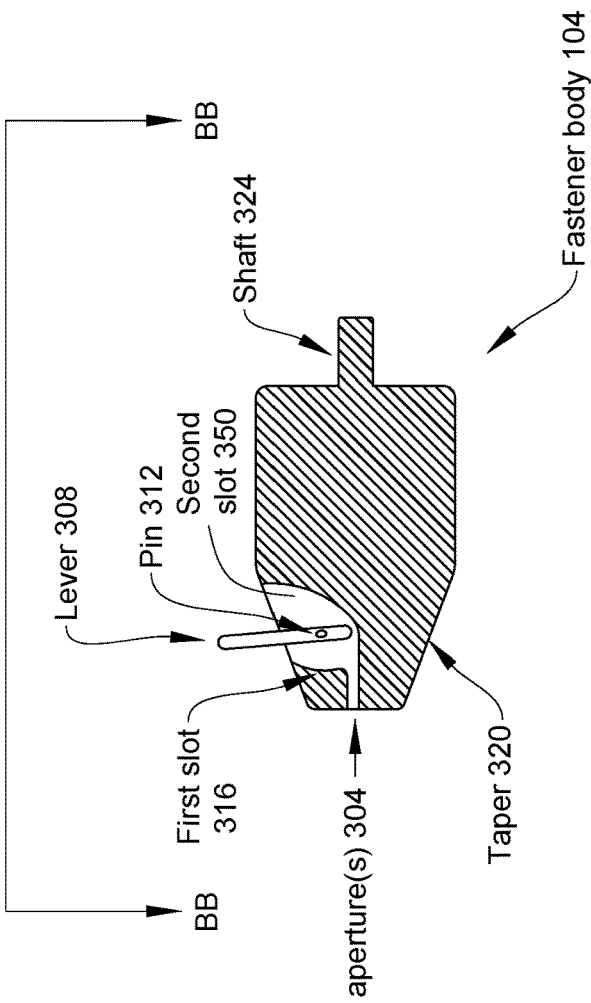

As shown in FIGS. 3, 4A, and 4B, in an embodiment, cam-locking levers 308A and 308B are incorporated to insure that the safety wire is properly secured within the fastener body 104 prior to beginning the process of twisting the safety wire. The lever(s) 308 may incorporate a spring mechanism (not shown) to return the lever(s) 308 back to an engaged position. In such an embodiment, the default position of the lever(s) 308 would be engaged\locked. This would be convenient in case a user lost their grip on the fastening body 104 or torque provider 108 during use. Because the lever(s) 308 would lock onto the safety wire and not lose their position, that user would not have to stop, re-begin the wire-threading process, and would not have to re-seat and re-engage the safety wire all over again.

In an embodiment, the lever(s) 308 are manufactured of A-2 tool steel or a similar suitable material which has a aperture through it allowing the lever(s) 308 to pivot around a pin 312. In an embodiment, the pin 312 can be a hardened dowel pin, roll pin, or similar item.

The fastener body 104 also has a slot 316 machined into a taper 320 to receive the lever(s) 308. The aperture(s) 304 are machined so as to connect with the slot 316, to allow the safety wire to pass through passageway 450 formed by these under the lever(s) 308.

The fastener body 104 may incorporate only a single aperture 308 in the small diameter end of the fastener body 104. Further, the taper 320 may also be omitted, thus achieving a straighter to the outer surface of the fastener body 104.

FIG. 4A shows a sectional side view of the fastener body 104 cut along the sectioning line BB-BB shown in FIG. 3. FIG. 4A uses the cut-away style in order to show the interior relationships of the aperture(s) 304, levers 308, pin 312, first slot 313 and second slot 350. FIG. 4B shows a passageway 450 formed by the aperture(s) 304, first slot 316, and second slot 350. During preparation and operation of the system 100, the safety wire will travel through this passageway 450.

When using the embodiments herein, the end or ends of the safety wire are entered into the apertures of the small diameter of the fastener body 104. The safety wire travels through the passageway 450 formed by the aperture 304 and first slot 316, before exiting through a second slot 350 located behind the lever(s) 308. Upon pulling the wire twisting tool away from the item the safety wire is attached to, the cam-locking lever(s) 308 fixedly engage with the safety wire, thus preventing the ends of the safety wire from being pulled back through the passageway 450 in the fastener body 104.

Once the cam-locking lever(s) 308 have fixedly engaged the safety wire, the torque provider 108 can then be activated. As such time, the fastener body 104 would be rotated about its center axis and thus would commence twisting the safety wire engaged by the head the fastener body 104.

As stated earlier, the slip clutch 208\600, or other torque limiting device can act to stop excessive or unwanted twisting of the fastener body 104 at a user-designated torque threshold.

To release the ends of the safety wire from the passageway 450 and the cam-locking lever(s) 308, the top end of the lever(s) 308 are specially positioned to be finger-accessible and thus easily pushed forward toward, which disengages the lever(s) 308 from the safety wire within the passageway 450. At that time, a user will pull the fastener body 104 away from the wire, leaving a completed twisted wire pair attached to the fastening mechanism.

Additionally, in a embodiment, the fastener body 104 will incorporate features such as a specially-shaped shaft 324 (FIG. 3, FIG. 5C), which may be machined onto body 104 or machined and attached to fastener body 104. In a non-limiting embodiment, the shaft 324 can be hexagonal, although other shapes and cross-sections could also be used. The shaft 324 could also be omitted and attached to the torque provider 108, or by various other ways of securing the fastener body 104 onto the torque provider 108.

FIGS. 5A, 5B, and 5C show front, side, and rear views of the fastener body 104, respectively. The shaft 324 is shown as hexagonal (e.g. FIGS. 5B, 5C), but may also be of any configuration that would effectively secure the fastener body 104 to the torque provider 108. Consequently, the shaft 324 should not be considered as limited exclusively to hexagonal-only, and other embodiments may also be used, for example either square, round, or round-slotted. In an embodiment, one way to achieve effective securing could be a groove 504 (see e.g. FIG. 5), to secure the shaft into the quick-disconnect collet 204 (FIG. 2), and/or a chamfer 508 to aid in ease of insertion into the quick-disconnect collet 204.

Figure 6B:
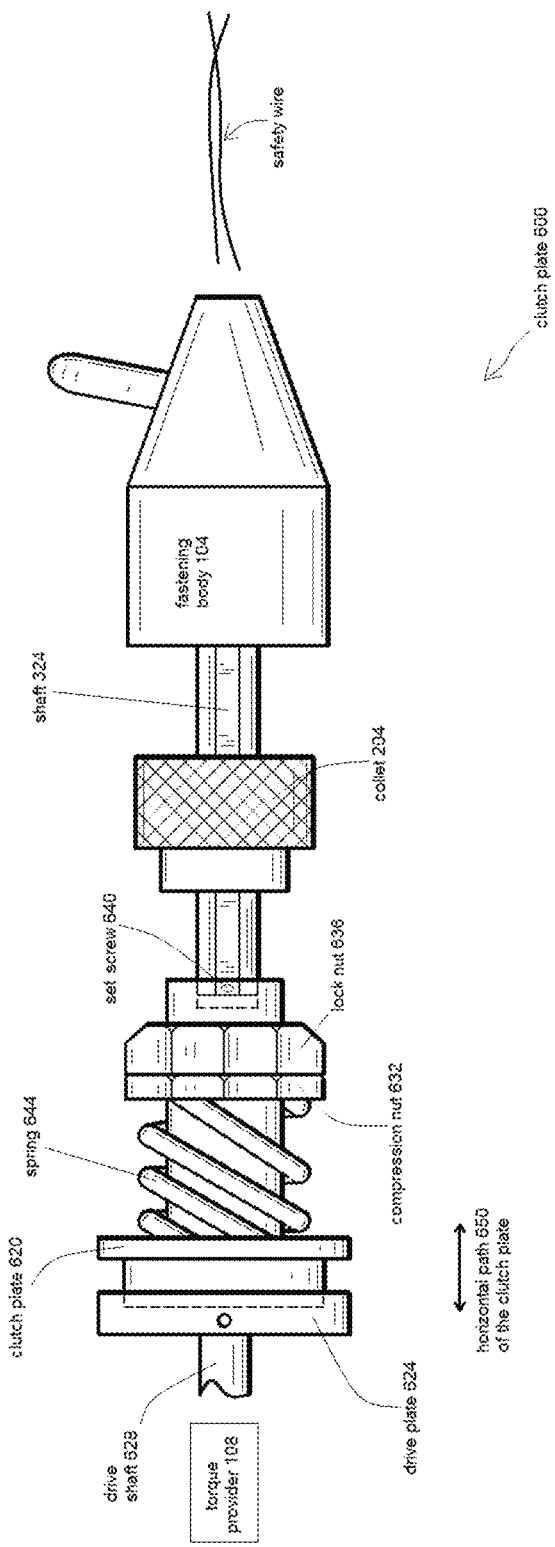
Figure 6C:
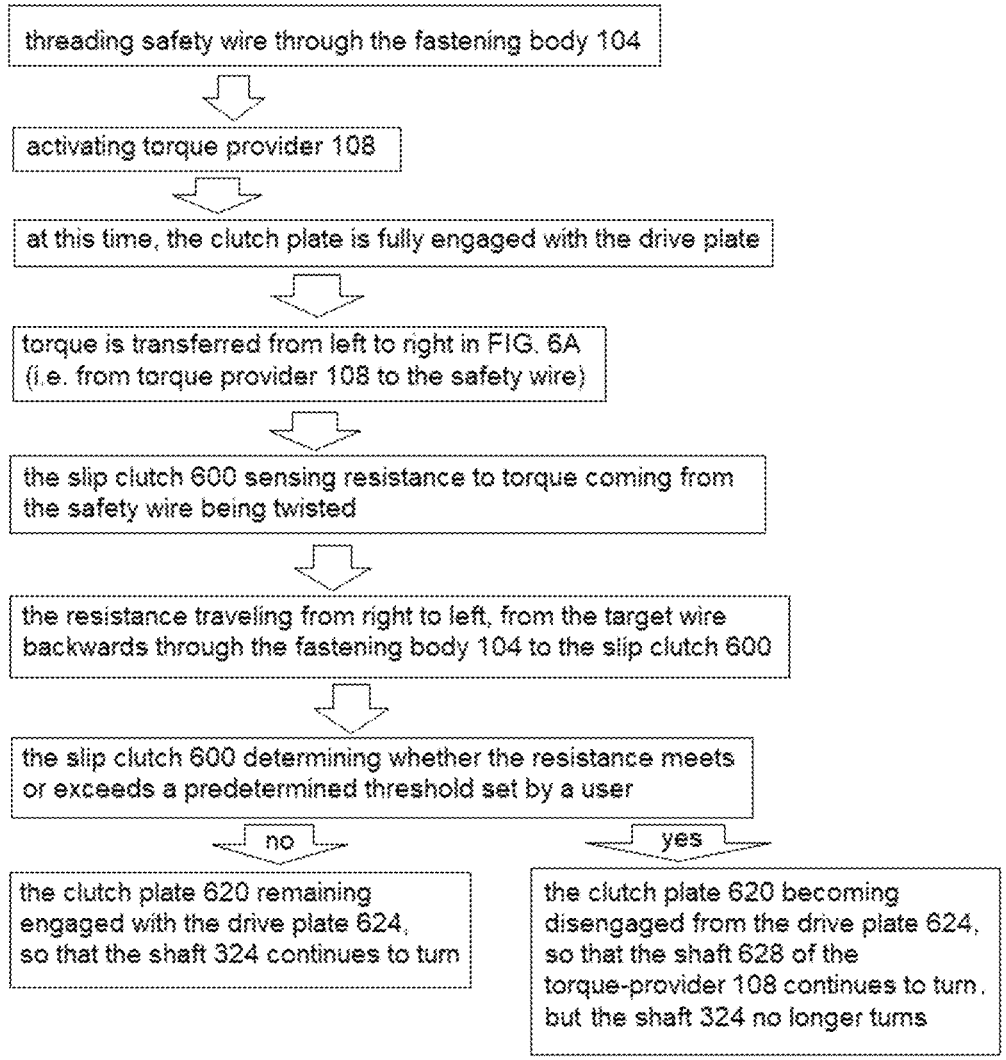

FIGS. 6A, 6B, and 6C show embodiments of the slip clutch 600. This feature is user-configurable and user-adjustable, through movement of the compression nut 632 and lock nut 636. The adjustability is for the purpose of setting the system 100 to respond to predetermined amounts of resistance to torque. This information is important for determining how many twists to make in a given length of safety wire, and can change depending on a lot of different factors e.g. width, durability, tensile strength, Young's modulus, and Shear modulus of a given type of safety wire.

In this embodiment, the fastening body 104 is not directly attached to the shaft 628 of the torque provider 108. Instead, the fastening body is attached to the shaft 324 which is attached to the clutch plate 620. The clutch plate 620 selectively engages and disengages with the drive plate 624, which is directly attached to the shaft 628 of the torque provider 108. Under most circumstances, including when the system 100 is at rest and not in use, the clutch plate 620 is mechanically attached to and moves in mechanical unison with the drive plate 624.

However, there are circumstances in which the clutch plate 620 separates from the drive plate 624, namely when a predetermined threshold of resistance to torque (coming from the safety wire currently engaged with the fastening body 104). At this time, when slip clutch 600 causes the fastening body 104 to cease rotating.

Normal operation of the system 100 and the clutch plate 600 occurs when the torque provider 108 drives (rotates) the drive plate 624. Under normal circumstances, pressure from the spring 644 onto the clutch plate 620 causes the clutch plate 620 to engage with the drive plate 624. The clutch plate 620 is affixed to the shaft 324, and the shaft 324 drives (rotates) the fastening body 104. Consequently, when the clutch plate 620 is engaged with the drive plate 624, and the torque provider 108 is activated, the fastening body 104 rotates.

However, when resistance to torque on the drive plate 624 reaches its max (e.g. when the wire reaches correct number of twists), the force being applied to the drive plate 624 exceeds the force of the spring 644 being exerted on the clutch plate 620, so that the clutch plate 620 becomes disengaged from the drive plate 620. At that time, the clutch plate 620 is no longer transferring rotational force to the shaft 324. Consequently, the shaft 324 will cease rotating, such that the fastening body 104 will in turn cease rotating.

The spring forces that clutch plate toward the drive plate. So, the clutch plate moves along the horizontal axis 650 shown in FIG. 6B. Meanwhile, the drive plate 624 is stationary, that is, it does not move along any horizontal axis, and instead remains fixed to the shaft 628 belong to the torque provider 108. A set screw 640 locks the drive plate onto the shaft 628.

FIG. 6C shows a flowchart of the events with and usage of the clutch 600.

In an embodiment, a cork ring 684 (FIG. 6A) having a cork pad 688 can be located between the clutch plate 620 and the drive plate 624. This reduces wear and tear on the two plates 620 and 624, and make the entire slip clutch 600 last longer and require less maintenance and adjustment.

While preferred materials for elements have been described, the embodiments herein are not limited by these materials. Wood, plastic, rubber, foam, metal alloys, aluminum, and other materials may comprise some or all of the elements of the safety wire twister embodiments described herein. Additionally, the fastener body 104 may be coated or plated various ways such as but not limited to chrome, zinc or black oxide.

FIGS. 8A, 8B, 8C, 8D, 8E, 8F, and 8G show a visual flow of how human hands might interact with the system 100. FIG. 8A shows safety wire sitting in an untwisted state. FIG. 8B shows initial threading of the safety wire through the fastening body 104. FIG. 8C shows the specific forcing of the safety wire into the fastening body 104, with the lever 308 being in an open, accessible position. FIG. 8D shows a user getting ready to move the lever 308 and push it to a closed (locked) position. FIG. 8E shows the lever 308 being in a closed (ready to twist) position, but where the safety wire has not yet started the twisting process. FIG. 8F also shows the lever 308 being in a closed (ready to twist) position, but where the safety wire is currently engaged the twisting process. FIG. 8G the safety wire being completed and properly twisted.

Once the safety wire has been twisted, but the fastening body 104 has not yet been removed, the process of removal is simple. A user merely moves the lever 308 back to its forward or "open" position, and then manually slides off the fastening body. The result is shown in FIG. 8G.

As stated, the present disclosure is to be considered as an exemplification of the invention, and is not intended to limit the invention to the specific embodiments illustrated by the figures or description below. That is, although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method of manufacturing a safety wire twisting system, comprising:
    attaching a fastening body to a shaft;
    configuring the fastening body to be rotatable about the axis of the shaft;
    configuring the fastening body to in incorporate at least one aperture acting as an insertion point for safety wire to be inserted;
    positioning at least one cam-locking lever within the fastening body;
    configuring first and second slots on either side of the cam-locking lever; and
    attaching a torque provider to the fastening body to provide rotation;
    determining a desired threshold of resistance to torque from the safety wire through the fastening body; and
    configuring and adjusting a compression nut and lock nut to match with the desired threshold of resistance.

2. The method of claim 1, further comprising:
    the torque provider acting as a mechanical means of rotation of the shaft.

3. The method of claim 2,
    further comprising:
    positioning a slip clutch within a fastening head; and
    the slip clutch acting as a torque limiter that automatically slips or disengages a clutch-fitting once a predetermined threshold of torque is achieved.

4. The method of claim 3, further comprising:
    configuring the slip clutch to be user-adjustable thereby obtaining a predetermined threshold number of twists per inch of the safety wire.

5. The method of claim 1, further comprising:
    configuring the fastener body to accept one or more free ends of the safety wire.

6. The method of claim 5, further comprising:
    the fastener body incorporating one or more apertures which can be locked to accept and secure the one or more free ends of the safety wire.

7. The method of claim 6, further comprising:
    locating the one or more apertures in a small diameter end of the fastener body; and
    the one or more aperture(s) accepting the one or more free ends of the safety wire.

8. The method of claim 1, further comprising:
    a pivoting head allowing use in horizontal or pistol grip configuration of the fastening body.

9. The method of claim 1, further comprising:
    locating a quick disconnect collet on the shaft for accepting a predetermined shape coupling of the shaft body.

10. The method of claim 1, further comprising:
    incorporating one or more cam-locking levers within the fastening body thereby insuring that the safety wire remains secured within the fastener body during use.

11. The method of claim 10, further comprising:
    the cam-locking levers incorporating a spring mechanism to return the cam-locking levers back to an engaged position.

12. The method of claim 10, further comprising:
manufacturing the cam-locking levers with an aperture therein for allowing the lever to pivot around a pin affixed to the fastening body.

13. The method of claim 10, further comprising:
one or more top ends of the cam-locking levers are specially positioned to be finger-accessible and thus accessible for being pushed forward.

14. The method of claim 1, further comprising:
the shaft being hexagonal.

15. The method of claim 1, further comprising:
determining a desired threshold of resistance to torque from the safety wire through the fastening body; and
configuring and adjusting the compression nut and lock nut to match with the desired threshold of resistance.

16. The method of claim 1, further comprising: attaching the fastening body to the shaft; and attaching the shaft to a clutch plate.

17. The method of claim 16, further comprising: directly attaching a drive plate to a shaft of the torque provider; wherein the clutch plate selectively engages and disengages with the drive plate.

18. The method of claim 16, further comprising: wherein when the system is at rest and not in use, the clutch plate being mechanically attached to and moving in mechanical unison with a drive plate.

19. The method of claim 18, further comprising:
affixing the clutch plate to the shaft such that the shaft drives (rotates) the fastening body such that when the clutch plate is engaged with the drive plate, and the torque provider is activated, the fastening body rotates.

20. The method of claim 1, further comprising:
the shaft further comprising a groove suitable for securing the shaft into a quick-disconnect collet.

\* \* \* \* \*